UNITED STATES PATENT OFFICE.

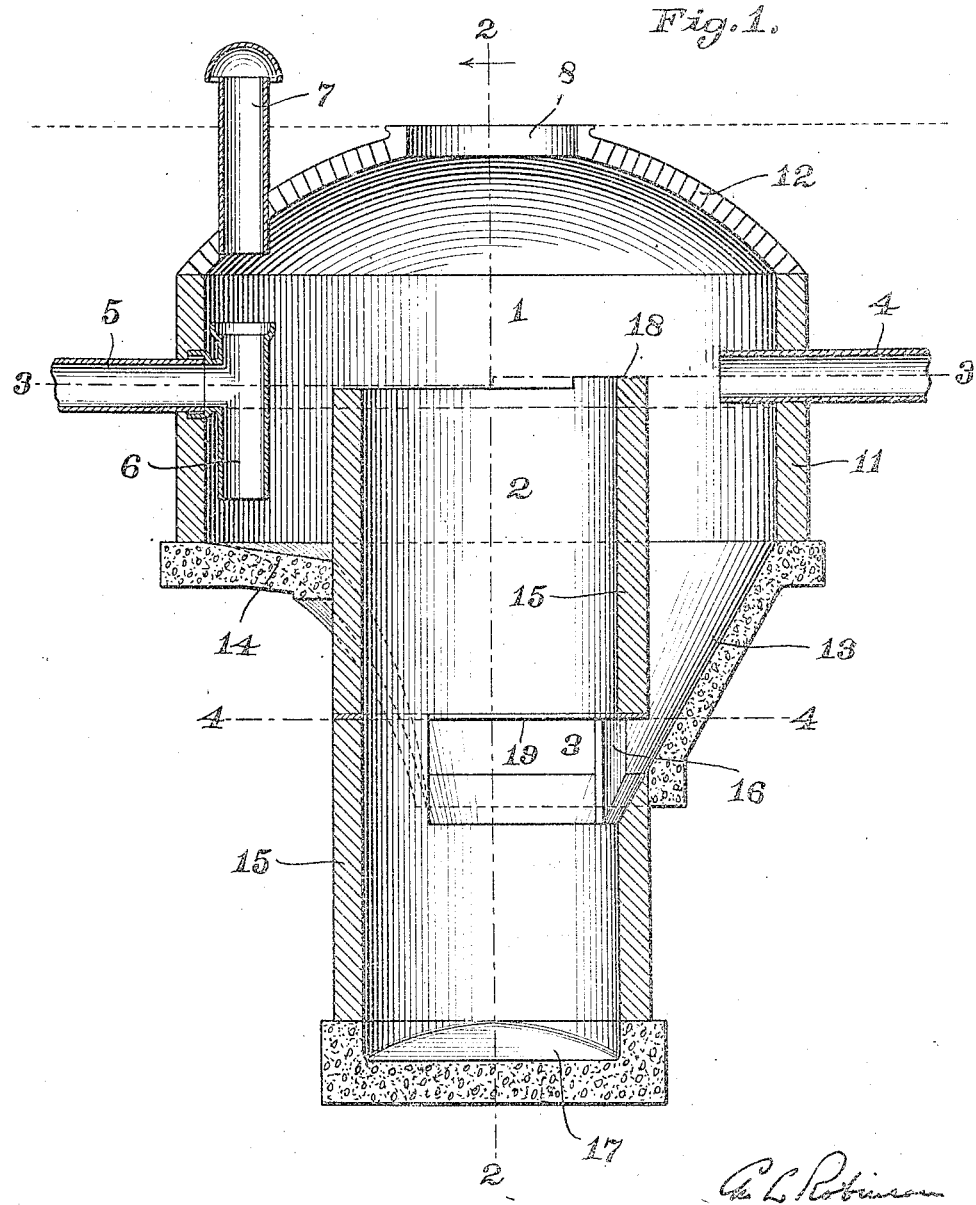

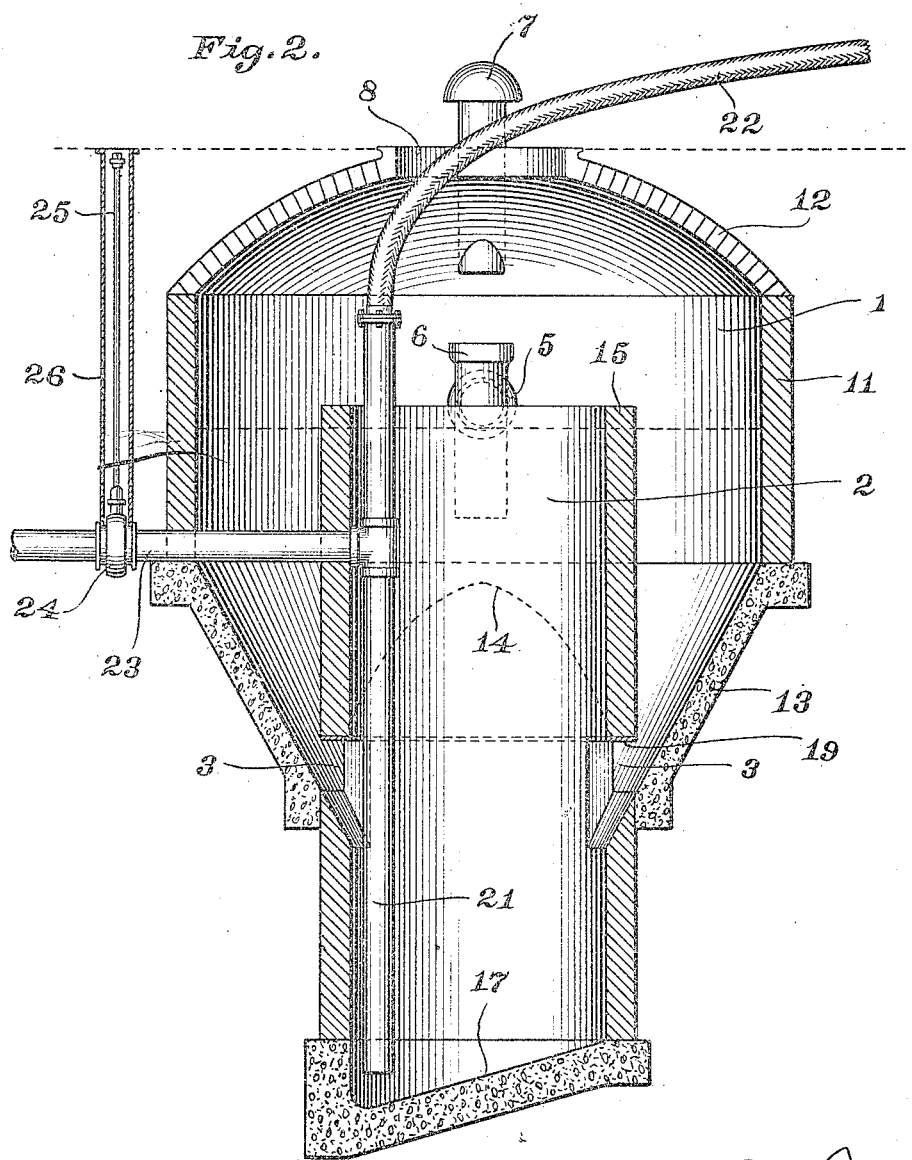

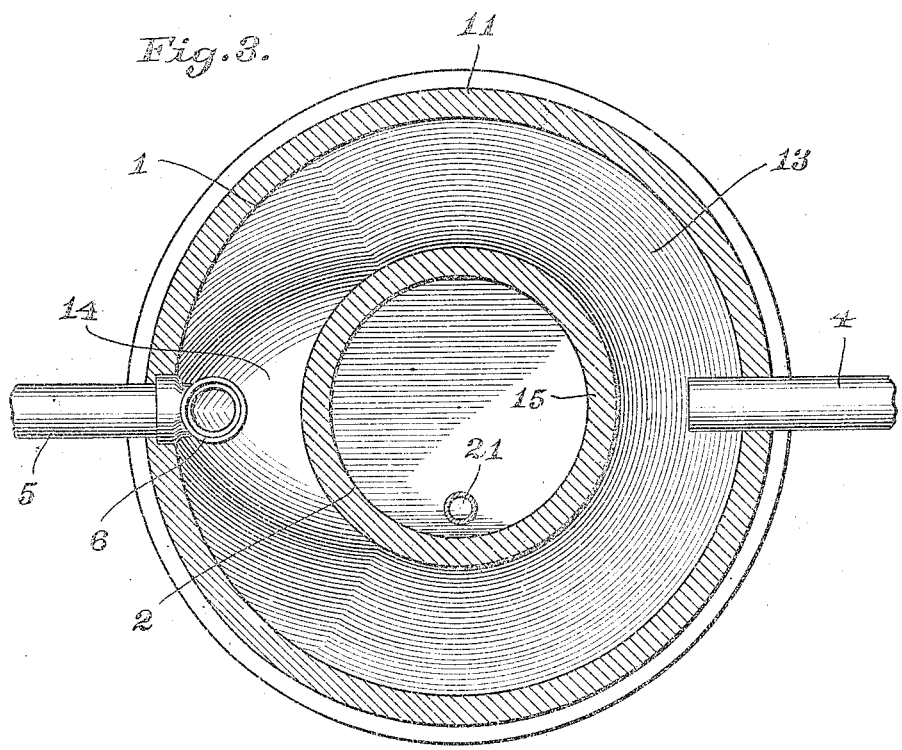
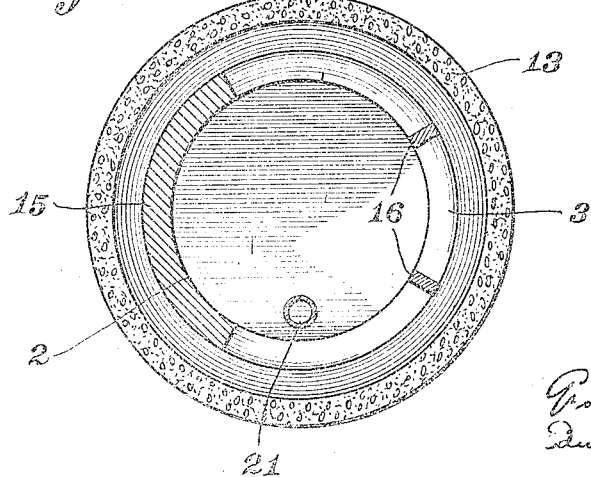

GEORGE L. ROBINSON AND EDWARD L. WAGNER, OF NEW YORK, N. Y., ASSIGNORS TO THE NEW YORK SEWAGE DISPOSAL COMPANY, A CORPORATION OF NEW YORK.

SEWAGE-DISPOSAL APPARATUS.

1,154,129.

Specification of Letters Patent. Patented Sept. 21, 1915.

Application filed March 11, 1915. Serial No. 13,686.

*To all whom it may concern:*

Be it known that we, GEORGE L. ROBINSON and EDWARD L. WAGNER, citizens of the United States of America, residing at the borough of Manhattan, New York city, county and State of New York, have invented certain new and useful Improvements in Sewage-Disposal Apparatus, of which the following is a specification.

Our invention relates to apparatus for purifying ordinary sewage by sedimentation and separation from the liquids of the solid matter heavier than water, which together from ordinary raw sewage. This is usually sought to be done by providing first a sedimentation chamber or settling tank through which the sewage passes slowly so that the heavier, solid particles may have opportunity to sink, and second, a digestion chamber or sludge tank at a lower level, but connected to the sedimentation chamber in such manner that the solid matter may fall into it and remain trapped there while the processes of digestion and fermentation proceed under favorable conditions and without opportunity for such solid matter to return to the raw sewage or to the clarified effluent which escapes at the outlet side of the sedimentation chamber.

Our invention consists specifically in a compact, cheap and highly efficient sedimentation and digestion apparatus in which the above described natural processes can be carried on to the best advantage, and from which the accumulating sludge can be removed with the greatest facility.

The best form of apparatus at present known to us embodying our invention is illustrated in the accompanying three sheets of drawings in which:

Figure 1 is a vertical central section of the apparatus with inlet and outlet connections broken away. Fig. 2 is a section on line 2—2 of Fig. 1 on a plane at right angles to that of Fig. 1. Figs. 3 and 4 are horizontal sections taken on lines 3—3 and 4—4, respectively, of Fig. 1.

Throughout the drawings like reference characters indicate like parts.

1, is the settling tank, or sedimentation chamber which is preferably made of circular horizontal section as shown, though it may be given other forms. As shown, this settling tank has the circular wall 11, a roof or cover in the shape of the dome 12, and a bottom divided into two portions 13, and 14, which will be described hereinafter.

4, is the inlet for the raw sewage and 5, is the outlet, both preferably radially disposed as shown. The outlet is at a little lower level, and located at the side of the settling tank opposite from the inlet.

6, is a T-trap on the outlet 5, which serves as a scum-guard and general protection against the passing out of undecomposed organic matter.

7, is a combined ventilator and inspection opening placed over the T-trap 6, so that, if necessary, a stick may be easily poked down into the T, and free escape for gases of fermentation is provided at all times.

8, is a manhole in the center of dome 12, through which the sludge may be removed.

In the settling tank 1, is set the sludge tank 2, forming the sedimentation chamber. Preferably this also is of cylindrical form, though other than circular cross section would serve, but it must have its horizontal dimensions considerably less than those of the settling tank 1. The upper edge of the circular wall 15, forming the sludge tank, extends above the level of the outlet 5, on the side toward the outlet, and on the side toward the inlet the wall is preferably raised still higher so as to form a lip 18. The sludge tank 2, extends some ways below the bottom of the settling tank 1, and at a point below the average level of the settling chamber bottom, and on the side nearest the inlet 4, there is a slot 3, or other opening, or connection, between the lowest part of the sedimentation chamber 1, and the interior of the sludge tank 2. As shown, this slot extends about two thirds of the way around the circumference of the sludge tank and the sludge tank wall above it may be conveniently supported on the iron ring 19, braced by struts 16, 16. Other forms of detail construction might be substituted for that shown. Adjacent to this slot 3, the bottom wall of the sludge tank is inclined downwardly and inwardly as shown at 13, to meet the wall of the sludge tank at the lower edge of the slot, the lower edge of which is cut away to form an extension of the inclined surfaces so formed. Under the outlet 5, the bottom of the settling tank rises to the form of a nearly level ridge, as shown at 14, but it falls away on either side to meet and merge in the inclined bottom portion 13, as indicated in the drawings.

To facilitate the discharge of the sludge the bottom 17, of the sludge tank 2, may be inclined to one side as shown, and a discharge pipe 21, or equivalent device, extended to the lowermost point.

22, indicates a hose which may extend from pipe 21, out through manhole 8, to a pump, not shown.

23, is a horizontally extending branch from pipe 21, below the normal water level in the tanks, and provided with a valve or gate 24, which may be operated by spindle 25, extending to the surface of the earth in which the apparatus is usually buried, through casing 26.

The mode of operation of our invention is as follows: Raw sewage pouring in through inlet 4, fills both tanks and the overflow escapes through outlet 5, establishing a normal water level below the top of wall 15, and lip 18. There is then created a slow current from 4, to 5. The raw sewage strikes the curved wall of cylinder 15, and is divided and deflected thereby. The drag of this wall and the downward tendency created by the slight drop from inlet 4, accelerates the downward movement of the particles of matter in the sewage which are heavier than water, with the result that they slide down the inclined bottom walls 13, or curved bottom walls at either side of ridge 14, of the settling tank, and pass through slot 3, into the sludge tank 2, while the clarified effluent passes out through the T-trap 6, and outlet 5. The solid particles thus trapped in the inner cylinder 2, may move downward and upward in the capacious and quiet segregated interior thereof, as they pass through various stages of fermentation, without any opportunity to get back into the settling chamber 1, and mix with the raw sewage. The raw sewage and the clarified liquids thereof flow around the sludge tank, but not into it. The liquid inside of the circular wall 15, is undisturbed by any current except those scarcely perceptible ones created by fermentation of, and displacement by, the particles of solid matter trapped in, or entering, the sludge tank. The scum arising in the sludge tank is allowed to collect undisturbed on the surface of the water within the circular walls 15, back of lip 18. Any grease floating on top of the sewage in the tank 1, is kept from mixing with the organic matter in the sludge tank. This prevents the particles of organic matter in the sludge being coated or embalmed by the grease and so being sealed and protected against the desirable breaking down action of bacteria.

When the digested sludge has accumulated at the bottom of the sludge tank in sufficient quantity, it may be removed through manhole 8, or if the discharge pipe 21, is employed, it may be pumped out through hose 22, or, again, if branch pipe 23, has been installed, the simple opening of valve 24, will permit the hydraulic head of water in the tanks to force the sludge up through pipes 21, and 23, and out at the lower level, thus automatically emptying the sludge tank.

Among the advantages of our invention may be mentioned its compact, simple and cheap construction and efficient separating or sedimentation action. The fact that the sludge tank or digestion chamber is open at the top is also beneficial as it gives every chance for the organic and floating matter to give off its gases and settle in a digested state to the bottom. This is a great advantage over the restricted gas vents of many prior constructions. This gas can pass off through the vent 7. At the same time the scum is not brought into contact with the walls of the tank to any considerable extent, and cannot adhere to them and foul the apparatus as occurs with constructions where the sludge tank or chamber is roofed over and the scum collects under and against such roof or covering.

It is evident that the forms and proportions of the parts might be varied from the exact outlines shown in the drawings and different materials used for construction without departing from the limits of our invention so long as the relative arrangement of elements and principle of operation above set out be preserved.

Having described our invention, we claim:

1. In a sewage disposal apparatus, the combination of a settling tank provided with an outlet at one side and an open inlet connection oppositely disposed thereto and at about the normal water level in said tank, and a sludge tank of smaller cross section located within the settling tank and having an opening through its walls connecting with the lower portion of the settling tank.

2. In a sewage disposal apparatus, the combination of a settling tank provided with an outlet at one side and an open inlet connection oppositely disposed thereto and at about the normal water level in said tank, and a sludge tank of smaller cross section located within the settling tank and having an opening through its walls connecting with the lower portion of the settling tank, the bottom wall of the settling tank adjacent said openings being inclined downwardly and inwardly to meet the wall of the sludge tank at the lower edge of said opening.

3. In a sewage disposal apparatus, the combination of a settling tank provided with inlet and outlet connections oppositely disposed and at substantially the same level, and a sludge tank of smaller horizontal dimensions than the settling tank located within the same open at the top and having an opening through its walls connecting with the lower portion of the settling tank on the inlet side only of said settling tank, the upper edge of the sludge tank wall being somewhat higher than the inlet and outlet connections, and the bottom of the sludge tank being at a considerably lower level than the opening from the settling tank.

4. In a sewage disposal apparatus, the combination of a settling tank provided with inlet and outlet connections oppositely disposed and at substantially the same level, and a sludge tank of smaller horizontal dimensions than the settling tank located within the same open at the top and having an opening through its walls connecting with the lower portion of the settling tank on the inlet side only of said settling tank, the upper edge of the sludge tank wall being somewhat higher than the inlet and outlet connections and having a raised lip on the inlet side, and the bottom of the sludge tank being at a considerably lower level than the opening from the settling tank.

5. In a sewage disposal apparatus, the combination of a settling tank provided with inlet and outlet connections oppositely disposed and at substantially the same level, and a sludge tank of smaller horizontal dimensions than the settling tank located within the same open at the top and having an opening through its walls connecting with the lower portion of the settling tank on the inlet side only of said settling tank, the upper edge of the sludge tank wall being somewhat higher than the inlet and outlet connections and having a raised lip on the inlet side, and the bottom of the sludge tank being at a considerably lower level than the opening from the settling tank, the bottom wall of the settling tank adjacent to said openings being inclined downwardly and inwardly to meet the wall of the sludge tank at the lower edge of said opening.

6. In a sewage disposal apparatus, the combination of a settling tank provided with an outlet at one side and an open inlet connection oppositely disposed thereto and at about the normal water level in said tank, and a sludge tank of smaller cross section located within the settling tank and having an opening through its walls connecting with the lower portion of the settling tank, and an inclined bottom, together with a discharge pipe extending from the lower part of the bottom of the sludge tank up through both sludge and settling tanks.

7. In a sewage disposal apparatus, the combination of a settling tank provided with inlet and outlet connections oppositely disposed, and a sludge tank of smaller cross section located within the settling tank and having an opening through its walls connecting with the lower portion of the settling tank, and an inclined bottom, together with a discharge pipe extending from the lower part of the bottom of the sludge tank up through both sludge and settling tanks, and provided with a branch extending horizontally at a level below that of the outlet from the settling tank.

8. In a sewage disposal apparatus, the combination of a settling tank provided with inlet and outlet connections oppositely disposed, and a sludge tank of smaller cross section located within the settling tank and having an opening through its walls connecting with the lower portion of the settling tank, and an inclined bottom, together with a discharge pipe extending from the lower part of the bottom of the sludge tank up through both sludge and settling tanks, and provided with a branch extending horizontally at a level below that of the outlet from the settling tank and means for controlling the flow through said branch.

9. In a sewage disposal apparatus, the combination with a settling tank provided with inlet and outlet connections oppositely disposed, the outlet connection being provided with a scum guard, of a sludge tank of smaller cross section located within the settling tank and having an opening through its walls connecting with the lower portion of the settling tank, and an inclined bottom, together with a discharge pipe extending from the lower part of the bottom of the sludge tank up through both sludge and settling tanks, and provided with a branch extending horizontally at a level below that of the outlet from the settling tank.

10. In a sewage disposal apparatus, the combination with a settling tank provided with inlet and outlet connections oppositely disposed, said outlet connection being provided with a scum guard and an inspection opening over it in the roof of the settling tank, of a sludge tank of smaller cross section located within the settling tank and having an opening through its walls connecting with the lower portion of the settling tank, and an inclined bottom, together with a discharge pipe extending from the lower part of the bottom of the sludge tank up through both sludge and settling tanks, and provided with a branch extending horizontally at a level below that of the outlet from the settling tank.

11. In a sewage disposal apparatus, the combination of a cylindrical settling tank having a normally open outlet at one point near its upper extremity and a radially disposed inlet connection opposite to said outlet and at about the level of said outlet, of a cylindrical sludge tank of lesser diameter located in the settling tank and substantially concentric therewith, the sludge tank having a horizontal slot cut through its walls near the bottom of the settling tank and on the side of the inlet thereto extending not more than two-thirds of the way around the circumference of said sludge tank.

12. In a sewage disposal apparatus, the combination with a cylindrical settling tank having radial inlet and outlet connections oppositely disposed, of a cylindrical sludge tank of lesser diameter located in the settling tank and substantially concentric therewith, the sludge tank having a horizontally extending slot cut through its walls near the bottom of the settling tank on the same side as the inlet and extending around about two thirds of the circumference and the bottom of the settling tank adjacent to said slot being inclined inwardly and downwardly to the lower edge of the slot, while the bottom of the settling tank on the same side as the outlet is approximately horizontal but curves downward to meet the inclined portions, on either side.

13. In a sewage disposal apparatus, the combination with a cylindrical sludge tank open at the top, of a circular settling tank surrounding said sludge tank top and provided with oppositely disposed inlet and outlet connections, said sludge tank having an opening in its walls on the same side as the inlet, and the bottom of the settling tank extending downward to meet the walls of the sludge tank just below said opening, the upper walls of the sludge tank extending somewhat higher than the normal water level in the settling tank, and having an additionally raised lip on the inlet side.

14. In a sewage disposal apparatus the combination of a settling tank provided with an outlet at one side and an open inlet connection oppositely disposed thereto and at about the normal water level in said tank, of a sludge tank of smaller horizontal dimensions set in the floor of a settling tank extending from approximately the level of the outlet to a considerable distance below the bottom of the settling tank, and a normally open connection from the lower portion of the settling tank on the inlet side thereof only to the lower portion of the sludge tank.

15. In a sewage disposal apparatus, the combination with a settling tank having inlet and outlet connections on opposite sides, of a sludge tank of smaller horizontal dimensions set in the floor of the settling tank and extending from approximately the level of the outlet to a considerable distance below the bottom of the settling tank, and a normally open connection from the lower portion of the settling tank on the inlet side to the lower portion of the sludge tank, together with means for discharging the solid matter collecting in the bottom of the sludge tank through the agency of the hydraulic head existing in the apparatus when filled with liquid to the level of the outlet.

GEO. L. ROBINSON.
EDWARD L. WAGNER.

Witnesses:
E. F. RANDOLPH,
EDITH F. GORDON.